Patented Aug. 23, 1932

1,873,348

UNITED STATES PATENT OFFICE

EARL DAVIS SMITH, OF KENVIL, NEW JERSEY, ASSIGNOR TO ALUMINUM COMPANY OF AMERICA, OF PITTSBURGH, PENNSYLVANIA, A CORPORATION OF PENNSYLVANIA

METHOD OF MAKING BASIC ALUMINUM SULPHATE

No Drawing.     Application filed March 29, 1929. Serial No. 351,124.

This invention relates to the manufacture of aluminum sulphate from bauxite residues, or the like, and sulphuric acid.

One of the objects of the invention is to utilize the residues resulting from a caustic digestion of aluminous material or from a caustic digestion of the material resulting from a caustic or alkali carbonate sinter, or fusion, of an aluminous material. Such residues are commonly known as "red mud" and usually contain between 11% and 45% $Al_2O_3$, 5% and 66% $Fe_2O_3$, 1% and 16% $SiO_2$, 6% and 17% $TiO_2$, 3% and 8% $Na_2O$ and other impurities in small amounts, as well as combined water. Such residues have been heretofore considered as by-products of little or no value.

A further object of the invention is to render the alumina soluble as aluminum sulphate and to obtain a product which does not give a free acid reaction and in which the presence of alumina is slightly in excess of that required by the formula $Al_2O_3.3SO_3$ as indicated by chemical analysis.

Aluminum sulphate containing free acid is objectionable as a commercial product, because the corrosive action of the acid makes handling or shipping of large amounts of the chemical difficult. Furthermore, in the art of water treatment where large quantities of aluminum sulphate are utilized, the presence of free acid is not desirable. For these and other reasons, it is of importance that the commercial aluminum sulphate should contain a small amount, say .1 to .5% of alumina in excess of that required by the formula $Al_2O_3.3SO_3$. Such a product will contain no free acid. Generally, the commercial practice of manufacturing such a basic aluminum sulphate comprises mixing bauxite, calcined clay, and like aluminous materials and sulphuric acid of suitable strength and applying heat to the mix, which reacts with considerable violence.

These reactions are accomplished in open pans or vessels and with the usual starting materials, the product obtained contains a satisfactory amount of free alumina and does not give an acid reaction. Under usual conditions, the only limitation to such a process is the strength of the sulphuric acid which may be used, it having been determined that sulphuric acid substantially stronger than 35° Bé. is not practical, as the mix becomes viscous and cannot be properly stirred or agitated during the reaction.

I have attempted to practice such a process as above described, by mixing bauxite residues and sulphuric acid of varying strength in an open pan or vessel and applying heat to start the reaction. Surprisingly, I have discovered that the aluminum sulphate obtained by such a method contains a large amount of free acid and is, therefore, objectionable. In experimenting with this process, I have used various strengths of sulphuric acid and have found, for example, that bauxite residues, either calcined or raw, will not sufficiently react with 35° Bé. sulphuric acid, at the boiling temperature and under atmospheric pressure, to form aluminum sulphate containing free alumina, whereas clay which has been calcined or bauxite under these same conditions will usually produce a satisfactory product. Further, I have discovered that 45° Bé. acid is the lowest strength which will react with bauxite residues to produce even a neutral aluminum sulphate in an open system. As heretofore mentioned, the use of sulphuric acid of this strength is not commercially feasible as the mix becomes too viscous.

In the art of manufacturing aluminum sulphate, it has been proposed to carry out the reaction between certain aluminous refractory material such as raw clay and the like and sulphuric acid in a closed system at high pressures. In the course of comprehensive experimentation with pressure digestions of bauxite residues and sulphuric acid, I have found that under the usual conditions of temperature and pressure heretofore practiced, with starting material such as clays and the like, the obtained product contains free acid and that the percentage recoveries of the reacting ingredients are low or impractical. However, I have further ascertained that within limits of temperature and pressure heretofore unknown and not practiced in the art, proper proportions of the reactants will produce a satisfactory basic aluminum sulphate and will give high percentage recoveries of the involved reactants.

According to my discoveries, a satisfactory product is obtained if the bauxite residues are mixed with sulphuric acid of approximately 45° Bé. or stronger and digested for periods ranging from 1 to 3 hours, under pressures not exceeding 40 to 50 lbs. per square inch. I have discovered that under the operating limit of 50 lbs. per square inch the maximum basicity is obtained at pressures between 15 and 25 lbs. per square inch, while below and above this pressure range the product becomes less basic and finally acid at the operating limit described. The strength of sulphuric acid which best produces the desired result lies between 40° and 55° Bé. depending upon the desired physical characteristics of the final product. I have also determined that it is desirable to control the period of digestion. Thus, if the period of digestion does not exceed 1 hour, a pressure of 50 lbs. per square inch may be used, whereas with longer digestion periods the pressure must be below 40 lbs. per square inch. Preferred practice, however, is to digest the materials for one hour under pressures of approximately 15 to 25 lbs. per square inch.

In order that the basic aluminum sulphate should contain only about 0.1 to 0.5% of alumina in excess of that required by the formula $Al_2O_3.3SO_3$, the reacting materials should be present in substantially combining proportions. If the sulphuric acid is in excess, basic aluminum sulphate will not be produced. The sulphuric acid therefore should be limited to about 95% or less of the bauxite residues used.

When bauxite residues, or the like, are digested with sulphuric acid at pressures greater than about 50 pounds per square inch, an insoluble aluminum sulphate is formed and precipitated from that digestion. This insoluble aluminum sulphate contains free alumina considerably in excess of that required by the formula $Al_2O_3.3SO_3$ and by reason of this large amount of alumina being precipitated from the digestion in an insoluble form, the ratio of aluminous material to sulphuric acid originally present in the digestion is unbalanced in favor of the acid content and therefore, the soluble aluminum sulphate which is finally formed is acid in nature. I have discovered that it is for this reason that processes heretofore described and employing digestion pressures greater than 50 pounds per square inch have not been satisfactory.

The reasons for the failure of the bauxite residue to react with sulphuric acid under the known and heretofore described methods to form an aluminum sulphate containing free alumina in excess of that required by the formula $Al_2O_3.3SO_3$ are not readily apparent. It may be pointed out, however, that the bauxite residues are the products of a caustic digestion, whereas the materials heretofore used such as bauxites, clays, and the like are natural products, perhaps differing in chemical nature from the aforesaid residues. Furthermore, it will be noted that bauxite residues usually contain a larger amount of ferric oxide and a smaller amount of alumina than do natural bauxite, clay, and like aluminous materials. However, the exact explanation of the chemical phenomena of my process is not essential to its understanding.

In order to carry out my process in a convenient manner it is necessary to conduct the reaction in a closed vessel to maintain the required pressure. The "red mud" or bauxite residue may be charged dry or in the form of a water slurry into the vessel and an amount of sulphuric acid, 40° Bé. or stronger and equivalent to approximately 95% or less of the $Al_2O_3.Fe_2O_3$, and $Na_2O$ contained in the "red mud", is introduced. The order of introduction of the materials is of no appreciable importance, insofar as the success of the process is concerned. However, it may be pointed out that if the "red mud" is charged in the form of a water slurry into the acid, an immediate reaction takes place evolving a large amount of heat which is often enough to obviate the preliminary heating of the mix which usually must take place when dry materials are charged into the sulphuric acid. In order to retain the mechanical advantage derived from adding the water slurry to the acid, it is necessary that the acid be first placed in a closed system, and the water slurry be then introduced in this system in such a manner that the pressure developed by the spontaneous reaction is not released. If, however, the "red mud" is charged in a dry form into the acid it may be and usually is necessary, to introduce steam to raise the temperature of the mix in order to start the reaction. The reaction proceeds rapidly and in most cases will be completed in 1 to 3 hours. After the completion of the pressure digestion, water or water containing aluminum sulphate obtained from washing the residue from a preceeding mix may be introduced into the digester under pressure, or the digested mix may be discharged into water or into water containing aluminum sulphate. The resulting sulphate solution of approximately 28 to 32° Bé. may be filtered or the insoluble residue may be settled. The clear solution is then evaporated to a concentration which will solidify upon cooling and form a solid cake which should contain .1 to .5% free alumina. The operations of dilution, filtration and evaporation may follow the usual commercial practice.

As an alternative method the digested mix may also be discharged directly from the digester into crystallizing pans and permitted to solidify. Under these conditions the alum cake will contain the insoluble constituents of the bauxite residue. If this procedure is followed it is desirable to increase the strength of the sulphuric acid to 50–55° Bé. in order to obtain a product which is sufficiently hard to crush. Such a product will contain 15 to 16.5% combined oxides of iron and aluminum.

In practicing my invention I use a pressure digester consisting of a closed vessel preferably lined with lead or with any material resistant to the corrosive action of the acid. The top of the digester contains a charging door for the bauxite residue and the acid and also a steam inlet and outlet. A stirring device is permanently fixed in the vessel and is so constructed as to satisfactorily mix the pasty mass. In the bottom of the digester is placed an outlet through which the mix may be discharged after the completion of the reaction. When the digester is of large capacity it may be necessary to provide means to maintain the pressure below 50 lbs. per square inch since large amounts of reacting materials may produce temperatures in excess of those necessary to obtain a satisfactory product.

The following examples illustrate the distinctive characteristics of the process and the preferred method of practicing my invention in order to secure a satisfactorily basic product.

A. One part of bauxite reside containing 42.5% $Al_2O_3$, 12.2% $Fe_2O_3$, 12.4% $SiO_2$, 13.4% $TiO_2$ and 7.5% $Na_2O$ was mixed with 2.7 parts of 45° Bé. sulphuric acid. The mix was placed in an autoclave and digested under a pressure of 100 lbs. per square inch and at a temperature of approximately 175° C. At the end of 3 hours the mix was diluted with 9 parts of water, filtered, and the insoluble residue boiled with 9 parts of water and again filtered. The combined filtrates on analysis were found to contain free acid and only 69% of the total $Al_2O_3$ and 82.5% of the total $H_2SO_4$ had been recovered.

B. One part of bauxite residue of the same analysis as in Example A was mixed with 2.7 parts of 45° Bé. acid and digested in an autoclave under a pressure of 15 lbs. per square inch and a temperature of approximately 125° C. for 3 hours. At the end of the digestion the mix was diluted with 9 parts of water, filtered, and the insoluble residues boiled with 9 parts of water and again filtered.

The combined filtrates of this digestion contained no free acid, but instead showed the presence of 0.17% of free alumina in excess of the formula $Al_2O_3.3SO_3$. 94% of the total $Al_2O_3$ and 98% of the total $H_2SO_4$ were recovered in the product.

C. An illustration of the effect of a long period of digestion at approximately the maximum pressure at which my process may be practiced is given in the following example. One part of bauxite residue of the analysis in Example A was mixed with 2.7 parts of 45° Bé. acid and digested in an autoclave under a pressure of 50 lbs. per square inch, and at a temperature of approximately 152° C. for 3 hours. After being diluted and filtered as in the above examples the analysis of the combined filtrates showed an acid product in which only 77.9% of the total $Al_2O_3$ and 88.7% of the total $H_2SO_4$ was recovered. This same digest after a one hour digestion period produces a satisfactorily basic product with a recovery of 95% of the alumina and 97% of the sulphuric acid.

D. One part of the bauxite residue containing 28.9% $Al_2O_3$, 19.6% $Fe_2O_3$, 15.2% $TiO_2$, 12.8% $SiO_2$, and 6.7% $Na_2O$ was digested with 2 parts of 50° Bé. sulphuric acid for one hour under a pressure of 15 lbs. per square inch and a temperature of approximately 125° C. The mix was diluted with sufficient water and filtered. The filtrate was evaporated so that a solid cake was formed. This product containing 0.25% free alumina was of the following approximate composition:

| | |
|---|---|
| $Al_2O_3$ | 11.30% |
| $Fe_2O_3$ | 6.2 |
| FeO | 0.35 |
| $TiO_2$ | 0.15 |
| $SiO_2$ | 0.05 |
| $Na_2O$ | 3.00 |
| $SO_3$ | 39.57 |

E. One part of bauxite residue of the same composition as in Example D was digested with 1.8 parts of 55° Bé. sulphuric acid for one hour under a pressure of 15 lbs. per square inch and a temperature of approximately 128° C. At the end of the digestion the mix was removed from the autoclave and allowed to solidify without further treatment. The cake thus formed possessed such physical characteristics that it was easily crushed. The product contained 0.34% soluble free alumina in excess of the formula $Al_2O_3.3SO_3$ and had the following approximate analysis:

| Soluble: | | | |
|---|---|---|---|
| $Al_2O_3$ | 10.25% | $TiO_2$ | 0.23% |
| $Fe_2O_3$ | 5.94% | $SiO_2$ | 0.05% |
| FeO | 0.35% | $Na_2O$ | 2.69% |
| | | $SO_3$ | 36.13% |

Insoluble ———— 13.4%

It may be seen from the above examples that satisfactorily basic aluminum sulphate may be obtained from bauxite residues. It will be further noted that the product of digestion will be useful even with the insoluble material remaining in the final cake as such a product may be used in the treatment of water.

I claim:

1. The process of producing basic aluminum sulphate comprising digesting together substantially combining amounts of bauxite residues and sulphuric acid at elevated temperatures and under pressures less than 50 lbs. per square inch.

2. The process of producing basic aluminum sulphate comprising digesting together substantially combining amounts of bauxite residues and spulphuric acid at elevated temperatures for less than 3 hours and under pressures less than 50 lbs. per square inch.

3. The process of producing basic aluminum sulphate comprising digesting together substantially combining amounts of bauxite residues and sulphuric acid exceeding 40° Bé. in strength at elevated temperatures and for less than 3 hours under pressures less than 50 lbs. per square inch.

4. The process of producing basic aluminum sulphate comprising digesting together substantially combining amounts of bauxite residues and sulphuric acid exceeding 40° Bé. in strength, at elevated temperatures and for 1 to 3 hours under pressures less than 40 lbs. per square inch.

5. The process of producing basic aluminum sulphate comprising digesting together substantially combining amounts of bauxite residues and sulphuric acid exceeding 40° Bé. in strength for less than 3 hours under pressures of approximately 15 lbs. to 25 lbs. per square inch.

6. The process of producing basic aluminum sulphate comprising digesting together substantially combining amounts of bauxite residues and sulphuric acid of about 50 to 55° Bé. in strength at elevated temperatures for an extended period of time and under a pressure of less than 50 lbs. per square inch and crystalizing the resultant products into a solid mass.

7. The process of producing basic aluminum sulphate comprising digesting together substantially combining amounts of bauxite residues and sulphuric acid exceeding 40° Bé in strength at elevated temperatures and under pressures between 15 and 25 lbs. per square inch.

8. The process of producing basic aluminum sulphate comprising digesting together substantially combining amounts of bauxite residues and sulphuric acid at elevated temperatures and under pressures between 15 and 25 lbs. per square inch.

9. The process of producing basic aluminum sulphate comprising digesting together substantially combining amounts of bauxite residues with sulphuric acid of approximately 40 to 55° Bé. in strength under elevated temperatures and for periods ranging from 1 to 3 hours and under pressures less than 50 lbs. per square inch.

10. The process of producing basic aluminum sulphate comprising digesting together substantially combining amounts of bauxite residues with sulphuric acid at elevated temperatures and under pressures less than 50 lbs. per square inch for extended periods of time, the pressures for the longer periods of time being less than for the shorter periods.

11. The process of producing basic aluminum sulphate comprising digesting together substantially combining amounts of bauxite residues with sulphuric acid, at elevated temperatures and under pressures less than 50 lbs. per square inch for a period of 1 to 3 hours, the pressures for the longer periods of time being less than for the shorter periods.

12. The process of producing aluminum sulphate of maximum basicity from a mixture comprising substantially combining amounts of bauxite residues and sulphuric acid, said process comprising digesting the mixture at elevated temperatures and under pressures within an intermediate pressure range less than 50 pounds per square inch.

13. The process of producing aluminum sulphate of maximum basicity from a mixture comprising substantially combining amounts of bauxite residues and sulphuric acid, said process comprising digesting said mixture at elevated temperatures and under pressures between 12 and 25 pounds per square inch.

In testimony whereof, I affix my signature.

EARL DAVIS SMITH.